United States Patent
Gmach et al.

(10) Patent No.: US 10,419,457 B2
(45) Date of Patent: Sep. 17, 2019

(54) SELECTING FROM COMPUTING NODES FOR CORRELATING EVENTS

(71) Applicant: Hewlett Packard Enterprise Development LP, Houston, TX (US)

(72) Inventors: Daniel Juergen Gmach, Palo Alto, CA (US); Alvin AuYoung, San Jose, CA (US); Robert Block, Sunnyvale, CA (US); Jayaram Kallapalayam Radhakrishnan, Palo Alto, CA (US); Suranjan Pramanik, Sunnyvale, CA (US); Julian James Stephen, Palo Alto, CA (US); Anurag Singla, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 193 days.

(21) Appl. No.: 15/305,615

(22) PCT Filed: Apr. 30, 2014

(86) PCT No.: PCT/US2014/036055
§ 371 (c)(1),
(2) Date: Oct. 20, 2016

(87) PCT Pub. No.: WO2015/167496
PCT Pub. Date: Nov. 5, 2015

(65) Prior Publication Data
US 2017/0048261 A1 Feb. 16, 2017

(51) Int. Cl.
*H04L 29/06* (2006.01)
*G06K 9/00* (2006.01)

(52) U.S. Cl.
CPC ........... *H04L 63/1416* (2013.01); *G06K 9/00* (2013.01); *H04L 63/1425* (2013.01)

(58) Field of Classification Search
CPC ........... H04L 63/1425; H04L 63/1416; H04L 63/1408; H04L 63/1441
See application file for complete search history.

(56) References Cited

U.S. PATENT DOCUMENTS

| | | | |
|---|---|---|---|
| 6,061,723 A | 5/2000 | Walker et al. | |
| 9,774,401 B1* | 9/2017 | Borrill | H04L 9/0852 |
| 9,830,804 B2* | 11/2017 | Kreiner | G08B 25/009 |
| 2004/0162741 A1 | 8/2004 | Flaxer et al. | |
| 2008/0244741 A1 | 10/2008 | Gustafson et al. | |

(Continued)

FOREIGN PATENT DOCUMENTS

| | | | |
|---|---|---|---|
| WO | WO-2000039674 A1 | 7/2000 | |
| WO | WO-2013019198 | 2/2013 | |
| WO | WO 2013019198 A1 * | 2/2013 | G06F 21/56 |

OTHER PUBLICATIONS http://clipsrules.sourceforge.net/WhatIsCLIPS.html—Last updated Jan. 24, 2008 (4 pages).

(Continued)

*Primary Examiner* — Mahfuzur Rahman
(74) *Attorney, Agent, or Firm* — Hewlett Packard Enterprise Patent Department

(57) ABSTRACT

In response to determining that an event matches a condition of a rule, a given one of a plurality of computing nodes is selected to send the event, based on one or both of an attribute of the event and an identifier of the rule. Information of the event is sent to the given computing node to perform correlation of the event with another event.

12 Claims, 5 Drawing Sheets

(56) References Cited

U.S. PATENT DOCUMENTS

| | | | |
|---|---|---|---|
| 2009/0216910 A1* | 8/2009 | Duchesneau | G06F 9/5072 |
| | | | 709/250 |
| 2010/0223628 A1 | 9/2010 | Rosenbluth et al. | |
| 2010/0250497 A1* | 9/2010 | Redlich | F41H 13/00 |
| | | | 707/661 |
| 2010/0332652 A1* | 12/2010 | Bhattacharya | H04L 41/069 |
| | | | 709/224 |
| 2011/0047262 A1 | 2/2011 | Martin et al. | |
| 2013/0104236 A1 | 4/2013 | Ray et al. | |
| 2015/0026027 A1* | 1/2015 | Priess | G06Q 40/00 |
| | | | 705/35 |
| 2015/0082399 A1* | 3/2015 | Wu | G06F 21/6209 |
| | | | 726/6 |

OTHER PUBLICATIONS http://esper.codehaus.org/; EsperTech Event Series Intelligence: Esper & NEsper; Event Processing with Esper and NEsper; Last Published: Feb. 14, 2014, V 4.11.0 (4 pages).

http:/;/hadoop.apache.org—HDFS Architecture Guide, Last Published Aug. 4, 2013 (8 pages).

IBM—InfoSphere Streams—Capture and analyze data in motion dated on or before Apr. 2014 (2 pages).

Jan Konczak et al., JPaxos—User Guide—Release 1.0, Jan. 2011 (25 pages).

Oracle, An Oracle White Paper, Hadoop and NoSQL Technologies and the Oracle Database dated Feb. 2011 (11 pages).

PCT Search Report/Written Opinion~Application No. PCT/US2014/036055 dated Jan. 20, 2015~9 pages.

Robinson Selvamony, SAP Labs India, Introduction to The Rete Algorithm, Dec. 17, 2010 (8 pages).

www.jboss.org/drools/—DROOLS Business Logic Integration Platform dated on or before Apr. 4, 2014 (3 pages).

www.jessrules.org/ JESS, the Rule Engine for the Java—Last modified Nov. 25, 2013 (2 pages).

www.pst.com/opsj_benchmark.html, Benchmarking OPS/J—Production Systems Technology dated on or before Apr. 4, 2014 (3 pages).

* cited by examiner

SELECTING FROM COMPUTING NODES FOR CORRELATING EVENTS

BACKGROUND

Events can be monitored in a distributed arrangement of devices that can be coupled over one or multiple networks. The events are represented by data collected by various sources in the distributed arrangement of electronic devices. The monitored events can be analyzed for various purposes. As an example, the events can be analyzed to identify an attack on a network or an electronic device, such that real-time countermeasures can be invoked to thwart the attack or mitigate the damage caused by the attack.

BRIEF DESCRIPTION OF THE DRAWINGS

Some implementations are described with respect to the following figures.

DETAILED DESCRIPTION

Figure 1:
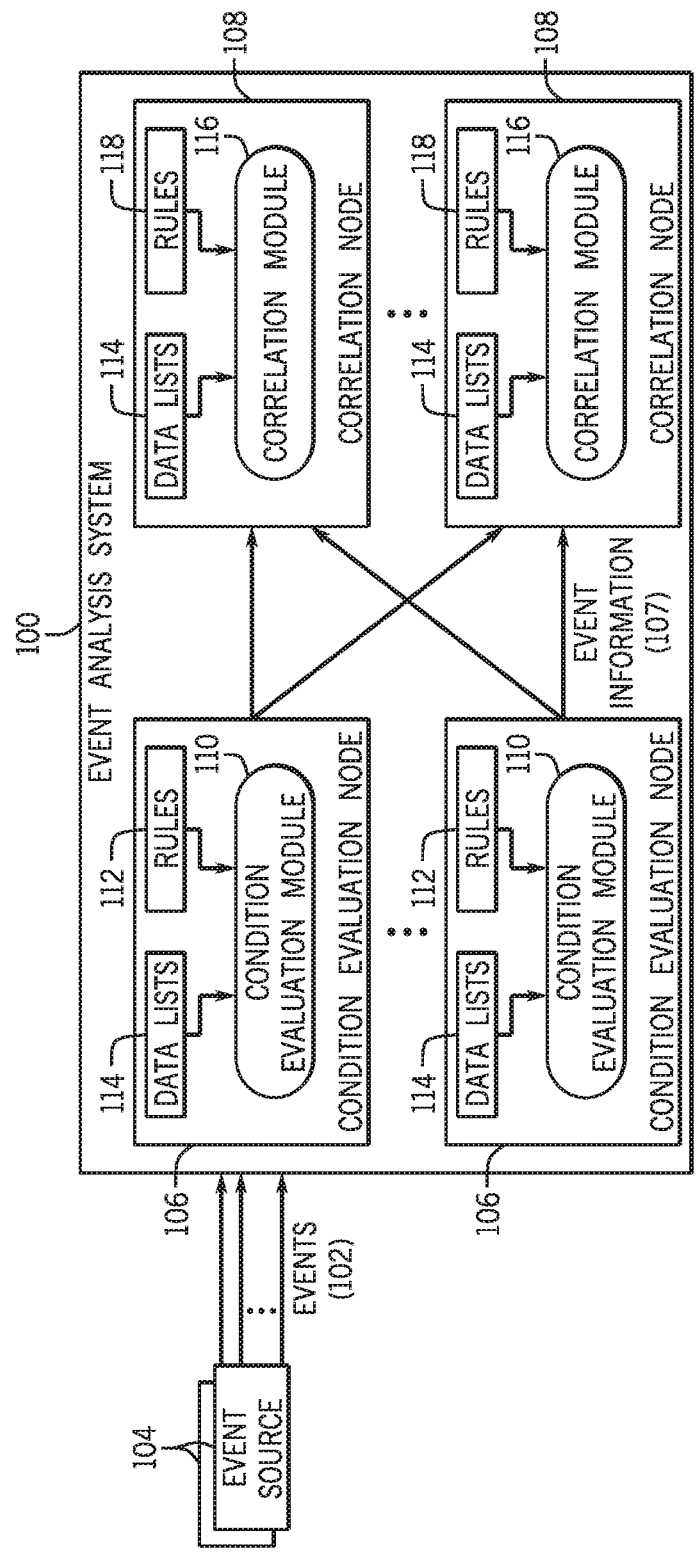
FIG. 1 is a block diagram of an example arrangement for performing distributed event processing, according to some implementations.

An event analysis system can receive events from multiple sources and can perform analysis of the received events for various purposes. An event can refer to an activity represented by data collected at a source. In some examples, a source can include a monitoring agent. A monitoring agent can be implemented as machine-readable instructions executing on an electronic device, or alternatively, a monitoring agent can be a standalone device coupled to a network or an electronic device that is being monitored.

An event can be triggered if monitored data satisfies a specified condition. The monitored data can relate to a login attempt, and the event may be triggered if the login attempt fails. Another example event is an event based on monitoring usage of a resource at an electronic device, such as a server computer, a communication switch or router, a storage subsystem, and so forth. If the monitored resource usage exceeds a specified threshold, then a corresponding event can be triggered. Data representing the event can be in the form of a message, an alert, or any other type of notification that can be sent from a monitoring agent to an event analysis system. Although specific examples are provided above, it is noted that there can be many other examples of events.

Analysis of events can be performed for one or some combination of the following purposes: to provide insight into activities within a distributed arrangement of electronic devices, to detect intrusion by an unauthorized entity (human or code), to determine compliance, to perform risk management, and so forth. Intrusion detection can be performed to identify intrusion of an unauthorized entity into a network or an electronic device. Compliance determination can be performed to determine whether an activity or data within a network or an electronic device satisfies a specified policy or government regulation. Risk management can be performed to ascertain a risk level associated with activities of an enterprise (e.g. a business concern, an educational organization, a government agency, etc.).

The event analysis system can employ a rules engine to determine whether a pattern of events (e.g. events that are within a certain time window, events that can be joined together, etc.) satisfies one or multiple rules. Traditionally, a rules engine of an event analysis system is not easily scalable to handle increasing workload (due to an increased number of events or event sources). To handle increased workload, an enterprise may have to invest in high-end hardware equipment (e.g. high-end server computers), which may be expensive. Alternatively, an enterprise can implement filters to restrict the ingested input stream of events, to avoid overloading the rules engine. However, restricting the ingested input stream of events can lead to deteriorated performance of an event analysis system.

In accordance with some implementations, an event analysis system is implemented with distributed computing nodes that can be easily scalable to accommodate increased event processing workload, such as due to an increased number of events. A computing node can refer to a computer, a collection of computers, a processor, or a collection of processors. To increase the capacity of the event analysis system, scale-out data processing can be implemented using the distributed computing nodes. Scale-out data processing refers to processing that can be scaled outwardly by simply adding more computing nodes; in this manner, existing computing nodes do not have to be upgraded with higher-end equipment. Techniques or mechanisms to provide the scale-out data processing are discussed further below.

As the number or source of events to be processed is increased, the number of distributed computing nodes can be increased to handle the increased event processing workload.

As shown in FIG. 1, an event analysis system 100 receives events 102 from one or multiple event sources 104. The event sources 104 can include monitoring agents, as noted above. The rules engine of the event analysis system 100 can be implemented as machine-readable instructions that are executed in a distributed manner by multiple computing nodes (106 and 108).

The rules engine can analyze events in an input data stream for detecting interesting events or patterns, based on one or multiple rules. In some examples, a rule can include multiple parts: (1) at least one condition that is to be met, and (2) at least one action that is to be triggered if an incoming event matches the condition. Examples of conditions can include a simple condition, a join condition, a time aggregation condition, a condition based on lookup of data lists, or any other condition.

A first event can include an event from a log of a Hypertext Transfer Protocol (HTTP) server. Another event can include an event from a log of a Domain Name System (DNS) server. Yet another event can be an event from a firewall. More generally, different events may originate from different sources. In further examples, other events can include events relating to financial activities of an enterprise, events relating to sales activities of an enterprise, events relating to human resources activities, and so forth.

Conditions specified in a rule can range in complexity. For example, a simple condition can perform a string match of an attribute (or attributes) of an event with a specified target value (or values). A specific example of a string match condition is "IPaddress==10.10.10.10," which attempts to match an Internet Protocol (IP) address of an event with a target value (10.10.10.10). In other examples, more complex conditions can be specified, such as conditions that employ expressions, conditions based on lookup of data lists, and so forth.

Some rules can also specify correlations between events. A correlation can refer to either time aggregating events or joining events, or both. Correlating events can refer to discovering a relationship among the events to determine the significance of such relationship, so that an action can be taken based on the correlated events.

For example, a rule may specify that a condition is satisfied only if a minimum number of relevant events are detected within a specific time window. To determine if this rule is satisfied, the relevant events occurring within the specific time window are collected or aggregated (a process referred to as time aggregation).

In a specific example, an event analysis system can use a rule to identify potential attackers on a server from a stream of HTTP log events. The conditions of the rule can be as follows: "identify any sequence of 10 malformed HTTP requests from the same IP address made within a one-minute window." The time aggregation performed for this rule would collect events relating to malformed HTTP requests from the same IP address within the one-minute window. The event analysis system can then determine whether there are at least 10 such events in the one-minute window to determine if the rule is satisfied. If the rule is satisfied, then the event analysis system can trigger an action specified in the rule. As an example, the action can be to add the IP address to a blacklist of IP addresses that are blocked from accessing a network or electronic device.

A rules engine of an event analysis system can also perform a join of events, based on a join rule. A join rule correlates different events. The different events may be generated by a single source or by multiple sources.

The evaluation of conditions in rules and the correlation of events can be distributed across the computing nodes of the event analysis system 100. The event analysis system 100 includes condition evaluation nodes 106 that can perform the evaluation of conditions in rules. The event analysis system 100 also includes correlation nodes 108 for performing the correlation of events.

In accordance with some implementations, both the condition evaluation tasks and the correlation tasks can be distributed across multiple computing nodes. In other words, a first set of computing nodes can be used to perform distributed condition evaluations, and a second set of computing nodes can be used to perform correlation. Note that the first set and the second set of computing nodes can be different sets of computing nodes, or can be a common set of computing nodes. In other words, the condition evaluation nodes 106 can be different from the correlation nodes 108, or alternatively, they can be the same computing nodes.

The events 102 are received by respective condition evaluation nodes 106. Each condition evaluation node 106 includes condition evaluation module 110, which can be implemented as machine-readable instructions executable in the respective condition evaluation node 106. The condition evaluation module 110 evaluates received events against rules 112 stored in the respective condition evaluation node 106. Each condition evaluation node 106 also stores data lists 114, which can include shared global state information to be evaluated against one or multiple rules 112. Examples of the data lists 114 include a blacklist of IP addresses, a whitelist of IP addresses, an event counter (to count a number of events detected by the event analysis system), or any data structure containing information that can be used in evaluating a condition of a rule.

At least some of the data lists 114 can include dynamic data that can change, such as in response to an action performed when a specific rule is satisfied by a received event (or events). Since evaluation of the rules considers dynamic data, such rules can be referred to dynamic rules. As discussed further below, the data lists 114 are maintained synchronized across the various nodes 106 and 108 such that the nodes 106 and 108 have access to consistent data lists.

If an event satisfies a rule 112, a condition evaluation module 110 can determine if the action triggered by the rule 112 can be performed locally at the condition evaluation node 106. If the action can be performed locally, then information of such an event would not have to be forwarded to a correlation node 108.

On the other hand, if the condition evaluation module 110 determines that an event satisfies a correlation rule (e.g. a time aggregation rule or a join rule), then the correlation action triggered by the correlation rule cannot be performed locally at the respective condition evaluation node 106, in which case the condition evaluation module 110 forwards information of the event to a respective correlation node 108. Note that if the event satisfies multiple rules that involve correlation (time aggregation and/or event joining), then the condition evaluation module 110 can forward information of the event to multiple respective correlation nodes 108, where each correlation node performs a respective one of the correlations specified by the multiple rules. The information of events forwarded to correlation nodes 108 are referred to as 107 in FIG. 1. The information of an event 107 forwarded to a correlation node 108 includes meta information relating to the rule(s) that was (or were) matched to the respective event. For example, the information of an event 107 can include partial match information, which includes a subset of the events attributes combined with the identifier(s) of the rule(s) partially matched by the event. By sending just information of the event 107 rather than the entire event from a condition evaluation node 106 to a correlation node 108, more efficient usage of the communication bandwidth between the condition evaluation nodes 106 and the correlation nodes 108 is achieved.

Although not shown in FIG. 1, the correlation nodes 108 can also send messages back to the condition evaluation nodes 106. Also, condition evaluation nodes 106 can send messages to other condition evaluation nodes 106, and correlation nodes 108 can send messages to other correlation nodes 108.

Each correlation node 108 includes a correlation module 116, which can be implemented as machine-readable instructions executable in the respective correlation node 108. Each correlation node 108 also stores rules 118 and the data lists 114. The rules 118 stored at the correlation node 108 are correlation rules. In other examples, the rules stored at each correlation node 108 can be the same rules 112 stored at the condition evaluation nodes 106. Each correlation module 116 performs correlation of events forwarded from condition evaluation nodes 106, based on the rules 118 stored at the correlation node 108.

Figure 2A:
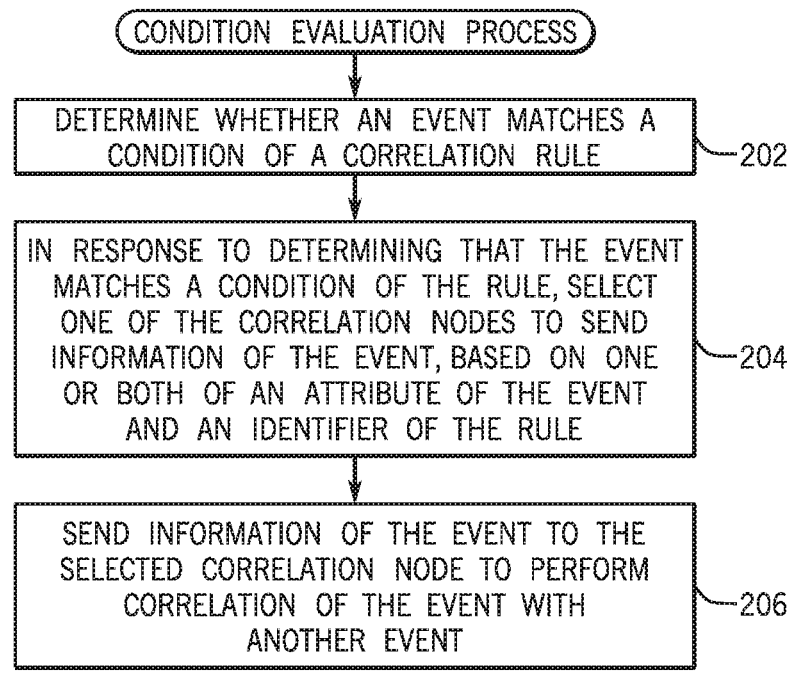
FIGS. 2A and 2B are flow diagrams of condition evaluation processes, according to various implementations.

FIG. 2A is a flow diagram of a condition evaluation process that can be performed by a condition evaluation module 110, in accordance with some implementations. The condition evaluation module 110 determines (at 202) whether an event received by the condition evaluation module 110 matches a condition of a correlation rule (from among the rules 112 in FIG. 1) that relates to correlating (e.g. time aggregating or event joining) of events.

Note that the matching of the event to a condition of the rule can be a partial match of the event to the rule. A rule can include multiple sets of conditions. An event can be compared against each of the multiple sets of conditions in the rule. A partial match refers to a situation where the event matches less than all sets of conditions in the rule. In some cases, the multiple sets of conditions can relate to different events. Thus, any given event may partially match just a subset of the conditions.

In response to determining that the event matches a condition of the correlation rule, the condition evaluation module 110 selects (at 204) one of the correlation nodes 108 to send information of the event (107 in FIG. 1), based on an attribute of the event and/or an identifier of the rule. Different values of the attribute (or of multiple attributes) may map to different correlation nodes 108. In some implementations, the correlation node 108 can be selected based on an identifier of the correlation rule, such that different rules would map to different correlation nodes 108. In other examples, selection of one of the correlation nodes 108 is based on both the attribute(s) of the event and the identifier of the rule.

The condition evaluation module 110 then sends (at 206) the information of the event to the selected correlation node 108 to perform correlation of the event with another event.

To enable the distributed processing of joins and aggregations, information of events that potentially can be joined or aggregated together are forwarded to the same correlation node 108. In some examples, a function (e.g. a hash function) is applied to one or multiple attributes of the event and/or to the identifier of the correlation rule. The function produces an output value (e.g. hash value). Different values output by the function cause different correlation nodes 108 to be selected.

Figure 2B:
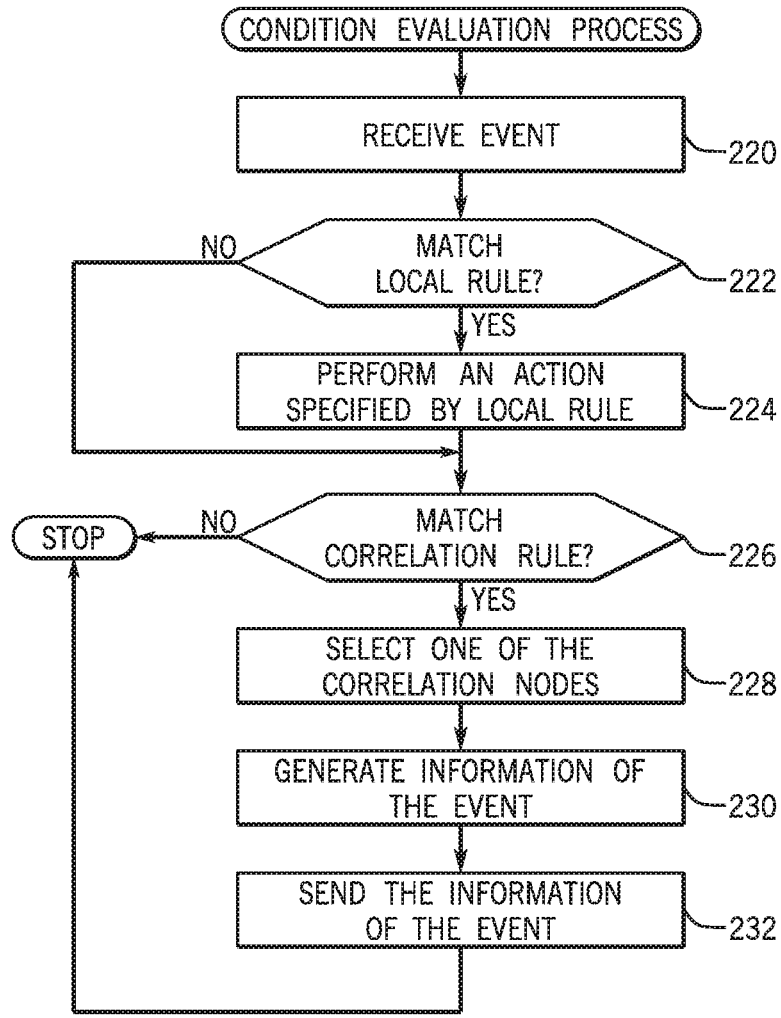

FIG. 2B is a flow diagram of a condition evaluation process that can be performed by a condition evaluation module 110, in accordance with further implementations. The condition evaluation module 110 receives (at 220) an event. The condition evaluation module 110 determines (at 222) whether the event matches a condition of a rule (from among rules 112 in FIG. 1) associated with an action that can be performed locally at the respective condition evaluation node 106 (such rule is referred to as a "local rule" below). If the event does not match any local rule, then the condition evaluation process proceeds to task 226.

However, if the event matches a local rule, then the condition evaluation module 110 performs (at 224) an action specified by the local rule.

The condition evaluation module 110 further determines (at 226) whether the event matches a condition of a correlation rule (from among the rules 112 in FIG. 1). If the event does not match any correlation rule, then the condition evaluation process stops.

However, if the event matches a correlation rule, the condition evaluation module 110 selects (at 228) one of the correlation nodes 108 to send information of the event (107 in FIG. 1), based on an attribute(s) of the event and/or an identifier of the correlation rule. The condition evaluation module 110 generates (at 230) information of the event (107 in FIG. 1) to send to the selected correlation node 108. As noted above, the information of the event (107) can include partial match information, which includes a subset of the event's attributes combined with the identifier(s) of the rule(s) partially matched by the event.

The condition evaluation module 110 then sends (at 232) the information of the event to the selected correlation node 108 to perform correlation of the event with another event.

Note that the event can match multiple local rules and/or correlation rules, in which case tasks 222 and 224 can be repeated for each match to a respective local rule, and tasks 226, 228, and 230 can be repeated for each match to a respective correlation rule.

If an event matches multiple correlation rules, then information of the event may be forwarded to multiple correlation nodes 108 (since the function applied to the event attribute(s) and the different rule identifiers would produce multiple output values, which potentially may map to multiple correlation nodes 108). In this case, the information of the event generated for a match to a first correlation rule may differ from information of the event generated for a match to a second correlation rule, so that different correlation nodes 108 would receive different information of the event.

Figure 3:
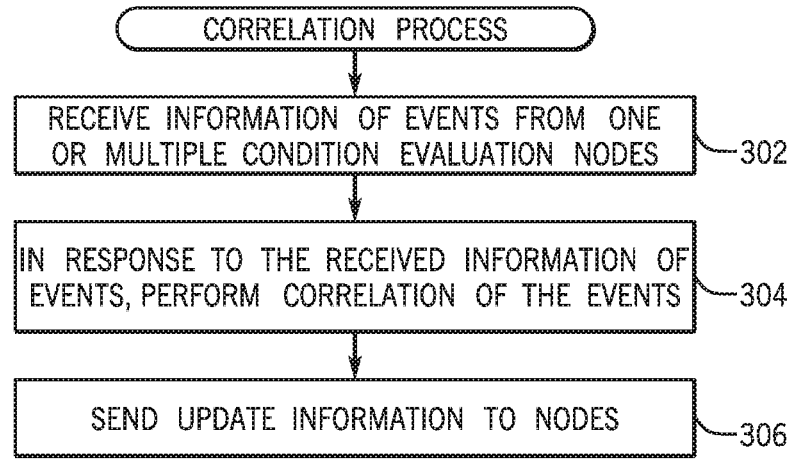
FIG. 3 is a flow diagram of a correlation process, according to some implementations.

FIG. 3 is a flow diagram of a correlation process that can be performed by a correlation module 116, in accordance with some implementations. The correlation module 116 receives (at 302) information of events from one or multiple condition evaluation nodes 106.

In response to the received information of events, the correlation module 116 performs (at 304) correlation of the events, which can include time aggregating and/or joining the events, as specified by the correlation rule(s) identified in the received information of events. For example, if the correlation rule is a time aggregation rule, then the correlation module 116 determines whether the events fall within a specified time interval. If so, the events can be time aggregated.

On the other hand, if the correlation rule is a join rule, then the correlation module 116 can determine if the events satisfy respective sets of conditions in the correlation rule (where each set of conditions corresponds to a respective event). If the different events satisfy the respective different sets of condition of the join rule, then the events of can be joined.

A join rule connects different events that have certain attributes in common. An example join rule can include a first set of conditions that relate to an event from an intrusion detection system, which is directed to a specific resource on a specific port. A second set of conditions of the join rule may specify an event associated with a firewall that is directed to a specific resource on a specific port. Attributes of the different events that are compared for purposes of joining the events can include any or some combination of the following: a source address, a target address, a source port, a target port, and so forth. If the values of the attributes being compared match, then the different events can be joined.

The correlation module 116 can also send (at 306) update information to nodes (condition evaluation nodes 106 and correlation nodes 108) to update one or multiple data lists 114, in the case where the correlation performed by the correlation module 116 results in an update of dynamic data in the one or multiple data lists.

Figure 4:
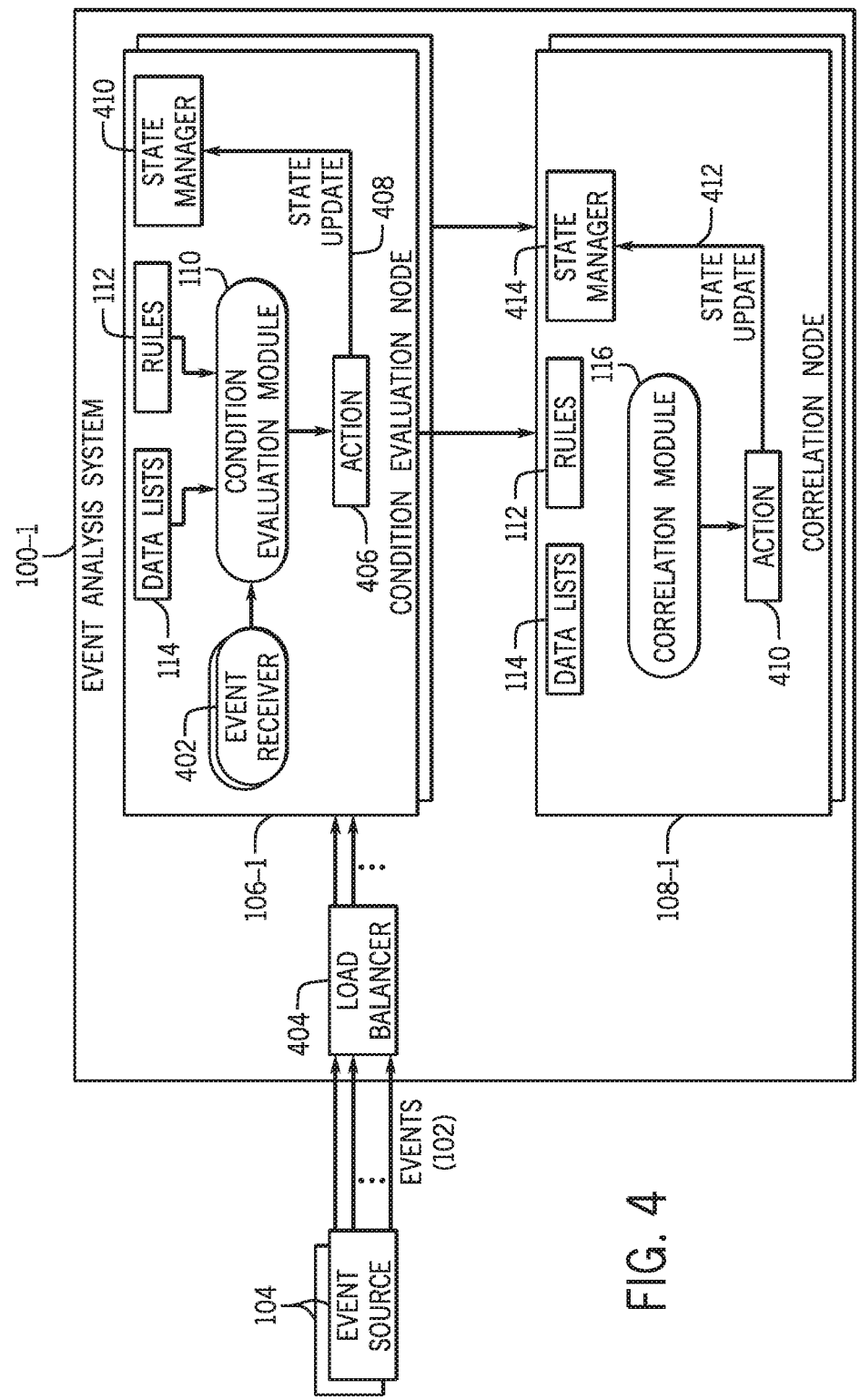
FIG. 4 is a block diagram of an example arrangement for performing distributed event processing, according to further implementations.

FIG. 4 is a block diagram of an example arrangement that includes an event analysis system 100-1 according to further implementations. The event analysis system 100-1 includes condition evaluation nodes 106-1 and correlation nodes 108-1. Each of the condition evaluation nodes 106-1 includes a respective condition evaluation module 110, which is similar to or the same as the condition evaluation module 110 discussed in connection with FIG. 1. Also, each of the correlation nodes 108-1 includes a correlation module 116 that is the same as or similar to the correlation module 116 discussed above in connection with FIG. 1.

Each condition evaluation module 106-1 further includes event receivers 402 for receiving events from event sources 104. The event analysis system 100-1 can include a load balancer 404 for distributing events received from the event sources 104 across the event evaluation nodes 106. The distribution of events across the condition evaluation nodes 106 can be performed to balance the workload of the condition evaluation nodes 106-1.

Each condition evaluation node 106-1 also stores rules 112 and data lists 114. If a condition evaluation module 110 determines that an event can be locally processed by the respective condition evaluation node 106-1, then the condition evaluation module 110 can trigger an action (406) corresponding to the rule that is satisfied by the event. If the action causes an update of dynamic data included in the data lists 114, then the update (408) can be sent to a state manager 410, for performing an update of one or multiple data lists 114.

If the condition evaluation module 110 determines that an event matches a correlation rule, then information of the event is forwarded to a selected one of the correlation nodes 108-1. The correlation module 116 in each correlation node 108-1 can perform correlation of events received from one or multiple condition evaluation nodes 106-1. In response to events satisfying a correlation rule (in the rules 118), the correlation module 116 can trigger an action (410). If an update of dynamic data in the data lists 114 is to be performed, then the update (412) is sent to a state manager 414 in the correlation node 108-1, for updating one or multiple data lists 114.

Although not shown in FIG. 4, the correlation nodes 108-1 can also send messages back to the condition evaluation nodes 106-1. Also, condition evaluation nodes 106-1 can send messages to other condition evaluation nodes 106-1, and correlation nodes 108-1 can send messages to other correlation nodes 108-1.

A challenge in performing event processing using distributed computing nodes is that the rules engine of the event analysis system may maintain shared global state information (in the form of the data lists 114, for example) that is used for the event processing. The event processing can use the shared global state information to determine whether one or multiple rules are satisfied. The shared global state information is shared among the computing nodes of the event analysis system (100 or 100-1). To maintain consistency of such shared global state information across the multiple computing nodes, any update (data insertion, data deletion, or data modification) of the shared global state information results in the update being broadcast to all other computing nodes, such as by using the state managers 410 and/or 414 of FIG. 4. The broadcast can be performed atomically using a consensus protocol, which guarantees a consistent ordering event update broadcasts among the condition evaluation nodes and the correlation nodes. Using this protocol, every node applies updates in the same order, thereby ensuring strong consistency of the shared global state information even in the case of node failure.

Figure 5:
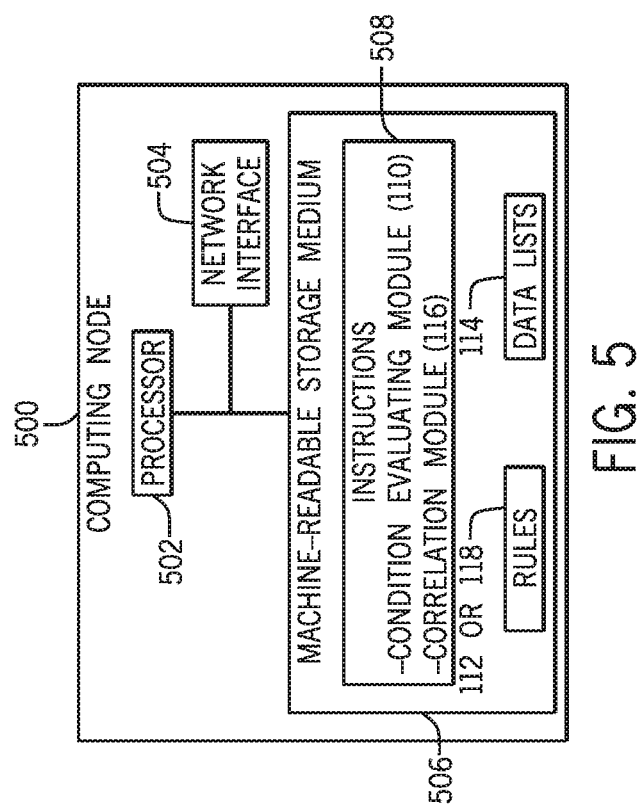
FIG. 5 is a block diagram of an example computing node, according to some implementations.

FIG. 5 is a block diagram of an example computing node 500, which can be used for implementing a condition evaluation node 106 or 106-1, or a correlation node 108 or 108-1. The computing node 500 includes one or multiple processors 502, which can be coupled to a network interface 504 to allow the computing node 500 to communicate over a network, such as to communicate with another computing node. A processor can include a microprocessor, microcontroller, processor module or subsystem, programmable integrated circuit, programmable gate array, or another control or computing device.

The computing node 500 also includes a non-transitory machine-readable or computer-readable storage medium (or storage media) 506, which can store machine-readable instructions 508. The machine-readable instructions 508 can include the condition evaluation module 110 or correlation module 116, in some examples. The storage medium (or storage media) 506 can also store the rules 112 or 118 and the data lists 114.

The storage medium (or storage media) 506 can be implemented with any or some combination of different forms of memory including semiconductor memory devices such as dynamic or static random access memories (DRAMs or SRAMs), non-volatile memories (e.g. memristor memories, phase change memories, etc.), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   determining, by a first computing node, whether an event matches a condition of a rule relating to correlating of events, the determining including evaluating the event with respect to the rule using dynamically changing data;
   in response to determining that the event matches the condition of the rule, selecting, by the first computing node, a second computing node of a plurality of computing nodes to send information of the event, based on a value of an attribute of the event, wherein different values of the attribute map to different computing nodes of the plurality of computing nodes; and
   sending, by the first computing node, the information of the event to the second computing node;
   correlating, by the second computing node, the event with another event;
   performing, by a system comprising the plurality of computing nodes, a countermeasure in response to the correlating;
   updating the dynamically changing data in response to an action performed as a result of the correlating of the event with another event;
   determining, by the first computing node, whether the event matches a condition of a second rule that specifies a local action to be performed at the first computing node;

in response to determining that event matches the condition of the second rule, performing the local action at the first computing node; and updating the dynamically changing data in response to the action performed at the first computing node, the dynamically changing data comprising a whitelist of network addresses or a blacklist of network addresses.

2. The method of claim 1, wherein the rule relates to joining of different events.

3. The method of claim 1, wherein the rule relates to aggregating events within a specified time interval.

4. The method of claim 1, further comprising:
determining, by a third computing node, whether a second event matches the condition of the rule;
in response to determining that the second event matches the condition of the rule, selecting, by the third computing node, the second computing node to send information of the second event, based on a value of an attribute of the second; and
sending, by the third computing node, the information of the second event to the second computing node to perform correlation of the second event and the event sent by the first computing node.

5. The method of claim 1, further comprising:
determining, by the first computing node, whether the event matches a condition of a second rule relating to correlating of events;
in response to determining that the event matches the condition of the second rule, selecting, by the first computing node, a third computing node of the plurality of computing nodes based on a value of an attribute of the event; and
sending, by the first computing node, information of the event to the third computing node to perform correlation of the event with another event according to the second rule, the information of the event sent to the second computing node being different from the information of the event sent to the third computing node.

6. The method of claim 1, wherein selecting the second computing node from among the plurality of computing nodes is further based on an identifier of the rule.

7. The method of claim 1, wherein determining whether the event matches the condition of the rule comprises evaluating the event with respect to the rule using a count value output by a counter that counts a number of events.

8. A system comprising:
a plurality of first computing nodes to receive events and to evaluate the events with respect to a rule; and
a plurality of second computing nodes to correlate events,
wherein a given first computing node of the plurality of first computing nodes is to:
determine that the events received by the given first computing node match a condition of the rule;
in response to the determining, select a second computing node of the plurality of second computing nodes, based on a value of an attribute of the events received by the given first computing node, wherein different values of the attribute map to different second computing nodes of the plurality of second computing nodes; and
send the events to the selected second computing node, and wherein the selected second computing node is to perform correlation of the sent events according to the rule to cause performance of a countermeasure in response to the correlation,
wherein the given first computing node is to perform the selecting by applying a function on the value of the attribute of the events received by the given first computing node and an identifier of the rule, the applied function producing a value that maps to the selected second computing node of the plurality of second computing nodes.

9. The system of claim 8, wherein the determining that the events received by the given first computing node match the condition of the rule is a determination that the events received by the given first computing node partially satisfy the rule.

10. The system of claim 8, wherein the selecting of the selected second computing node is further based on an identifier of the rule.

11. The system of claim 8, wherein the correlation comprises a join of different events according to the rule.

12. The system of claim 8, wherein the countermeasure comprises preventing intrusion of an attacker into a network or an electronic device.

* * * * *